E. T. PRINDLE.

Assignor to E. P. MONROE.

Piston-Rod Packing.

No. 8,411. Reissued Sept. 10, 1878.

Attest:
W. Burnham
Courtney A. Cooper

Edward T. Prindle
By his attorney
Oliver Drake.

UNITED STATES PATENT OFFICE.

EDWARD T. PRINDLE, OF AURORA, ILL., ASSIGNOR, BY MESNE ASSIGNMENTS, TO EDWIN P. MONROE, OF NEWARK, N. J.

IMPROVEMENT IN PISTON-ROD PACKING.

Specification forming part of Letters Patent No. 53,542, dated March 27, 1866; Reissue No. 8,411, dated September 10, 1878; application filed August 8, 1878.

*To all whom it may concern:*

Be it known that I, EDWARD T. PRINDLE, of Aurora, in the State of Illinois, have invented a new and Improved Mode of Packing Piston-Rods; and I do hereby declare that the following is a full, clear, and exact description thereof, reference being had to the accompanying drawing, &c., making a part of this specification, in which—

Figure 1:
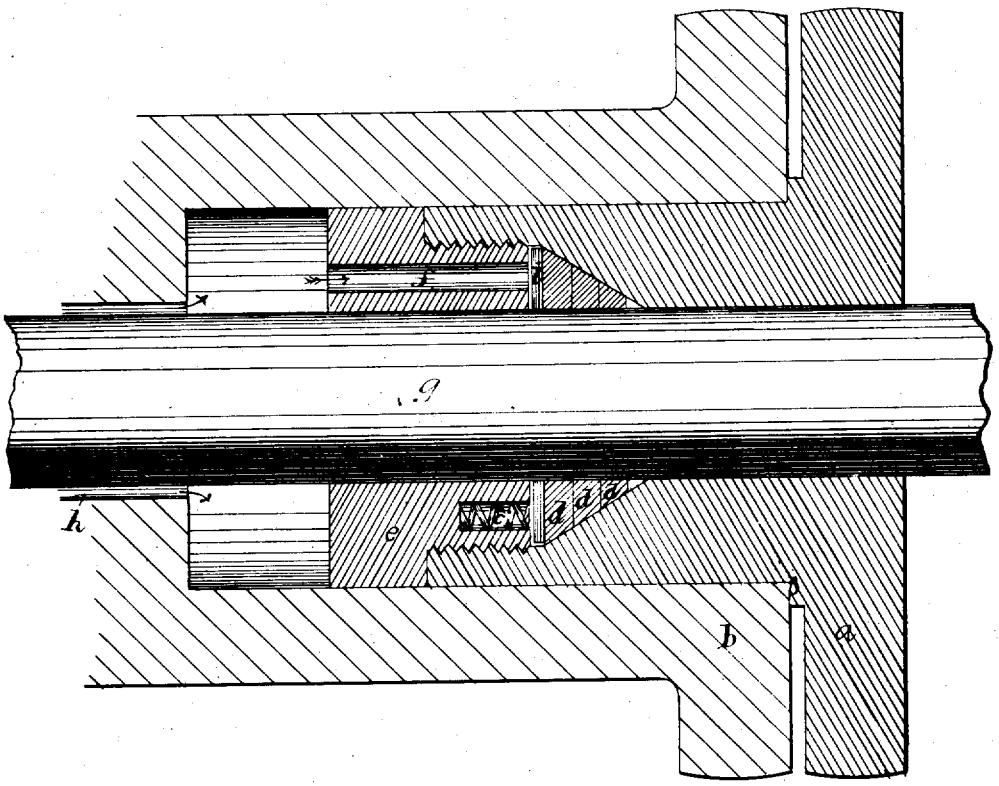
Figure 2:
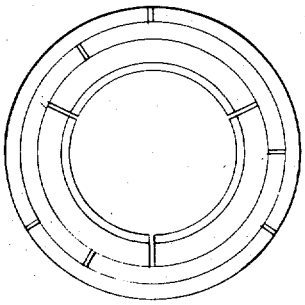

Figure 1 is a diametrical section through the stuffing-box of a steam-cylinder having my improved packing applied to it. Fig. 2 is a top view of the sectional packing-rings detached from the stuffing-box.

Similar letters of reference indicate corresponding parts in each figure.

This invention relates to a novel mode of packing the piston-rods of engines, the rods of pump-plungers, the stems of valves, throttles, &c., used either in steam, hydraulic, and pneumatic engines.

The object of the invention is to so construct and arrange a conical packing in a conical seat or chamber as that the said packing shall be compressed about the rod or stem by means of steam or other elastic agent injected against the facial base or broad end of the packing, and at the same time prevent the escape of steam, as will be hereinafter described.

To enable others skilled in the art to understand my invention, I will describe its construction and operation.

In the accompanying drawing, *b* represents the stuffing-box of a common steam-cylinder, and *a* is the gland thereof, which is fitted within this box and sealed at *j* by means of a ground joint. The inner end of the cylindrical portion of the gland is recessed to receive a cap, *e*, and also to receive a series of conical rings, *d*, as shown in Fig. 1. The cap *e* is perforated to receive springs *c*, one of which is shown in Fig. 1, and between these spring-receptacles holes *f* are made entirely through the cap, for the purpose of admitting steam from the steam-cylinder to act upon the packing-ring *d*, as indicated by the arrows in Fig. 1.

The perforated cap *e* may be screwed or otherwise fastened into the cylindrical end of the gland, and a space should be left between the packing-rings and the inner end of the cap *e* for receiving a circular plate or flat ring, *i*, against which the springs *c* act to keep said rings in place when they are not acted upon by the steam. A slight space may also be left between the ring *i* and the inner end of the perforated cap *e* for allowing the steam to act fully upon the rings *i* and *d d d*. These rings *d*, which surround the piston-rod *g*, may be made of Babbitt metal or of any other suitable substance which will answer the purpose. They are made in sections or segments, and arranged within their conical chamber in the gland-stem so as to break joints, as shown in Fig. 2. They therefore form a perfectly tight joint. But before these rings are cut, and while they are upon the mandrel or arbor, they should be ground into the conical seat with flour of emery, so that they will fit snugly therein.

When steam or other pressure is caused to act on the facial base or broad end of the conical packing through the openings *h h* and *f*, this packing will be forced hard against its conical seat, which will contract the segments or rings and compress them firmly about the rod *g*, and thus pack it uniformly tight. As the cylindrical surface of the packing wears away it is forced farther into its conical seat by the springs *c*, and then held to be acted upon by the steam or other pressure.

I am aware that conical segmental rings applied to a conical seat and acted upon by the gland-bolts of a stuffing-box is not new; neither do I claim, broadly, the sectional conical packing for piston or other rods.

My invention is to employ the pressure of steam, air, or water instead of the gland-bolts, as above described, for compressing the conical packing about the rod, and for this purpose it is necessary to so apply the conical packing that this pressure can act upon it in the manner stated.

Having thus described my invention, what I claim as new, and desire to secure by Letters Patent, is—

1. The combination of the piston-rod, a gland having the opening for the rod enlarged conically next to the steam side, a packing fitting therein, and means for admitting steam thereto, substantially as set forth.

2. The combination of the gland *b*, having a central rod-opening, conically enlarged toward the steam side, a conically-formed packing, *d*, fitting therein, and means for admitting steam thereto, substantially as set forth.

3. The combination, with the piston-rod, of a packing fitting into a conical or tapering opening about the rod, and held therein from the steam side by a spring bearing against the packing or a follower next thereto, substantially as set forth.

4. The combination of a piston-rod, a packing enlarged next to the steam side, and fitting into a conical or tapering opening around the rod, and means for admitting steam or other elastic agent thereto, substantially as set forth.

5. The combination of the perforated cap or head *e*, for the admission of steam or other elastic agent, with the packing fitting into a conical or tapering opening around the rod and enlarged next to the steam side, substantially as set forth.

6. The combination of the perforated cap or head *e*, spring *c*, bearing-ring *i*, and the sectional packing *d*, fitting into a conical or tapering opening around the piston-rod and enlarged next to the steam side, substantially as set forth.

In testimony that I claim the foregoing I hereto subscribe my name in presence of two witnesses.

EDWARD T. PRINDLE.

Witnesses:
IRA H. FITCH,
H. H. SHAW.